Dec. 19, 1922.                                                        1,439,142
L. J. BUOB.
AUTOMOBILE BODY CURTAIN.
FILED FEB. 27, 1920.

INVENTOR:
Louis J. Buob
BY
ATTORNEYS.

Patented Dec. 19, 1922.

1,439,142

UNITED STATES PATENT OFFICE.

LOUIS J. BUOB, OF CINCINNATI, OHIO, ASSIGNOR TO BUOB AND SCHEU, OF CINCINNATI, OHIO, A FIRM COMPOSED OF FRED. D. BUOB, LOUIS J. BUOB, FRONA BUOB, AND MARIE BUOB.

AUTOMOBILE BODY CURTAIN.

Application filed February 27, 1920. Serial No. 361,750.

*To all whom it may concern:*

Be it known that I, LOUIS J. BUOB, a citizen of the United States, and a resident of the city of Cincinnati, in the county of Hamilton and State of Ohio, have invented certain new and useful Improvements in Automobile Body Curtains, of which the following is a full, clear, and exact description, reference being had to the drawings forming a part of this specification.

My invention relates to body curtains for motor vehicles in particular, and vehicles in general, and has special application to curtains used in providing closed bodies for automobiles, composed of articulated and demountable sections.

There have been in the past year two general sorts of closed bodies for automobiles, one of which was a wood or metal structure with regular glass lights therein, and the other of which was an arrangement of side curtains, secured between the body and top of the vehicle and held over the doors thereof by means of irons, set in the doors and engaging the curtain portion so that it would swing with the door.

In this latter form of closure for automobile bodies, the lights were made of celluloid composition or isinglass, which is subject to rapid discoloration, and thus were unsatisfactory, while in the former instance the slamming of the doors, which is frequently necessary to enforce a closure of them, will result in a breakage of the glass, forming part of said doors.

It is the object of my invention to provide for a removable set of side curtains to enclose the space between a vehicle body and top and equip said curtains with ordinary glass, thereby obtaining in a removable structure many of the advantages of regularly built up enclosed bodies.

Among other things I re-enforce the main portion of the side and door curtains, which are used in my invention, so that they are stiff enough at the point of attachment of the glass, to retain a novel glass retaining means of my invention, while at the same time, the flexible nature of the curtain material elsewhere permits of its attachment and detachment, and takes away the danger of shattering the glass, when the doors are too forcibly closed.

My object and advantages above noted, I accomplish by that certain construction and arrangement of parts to be hereinafter more specifically pointed out and claimed.

Figure 1:
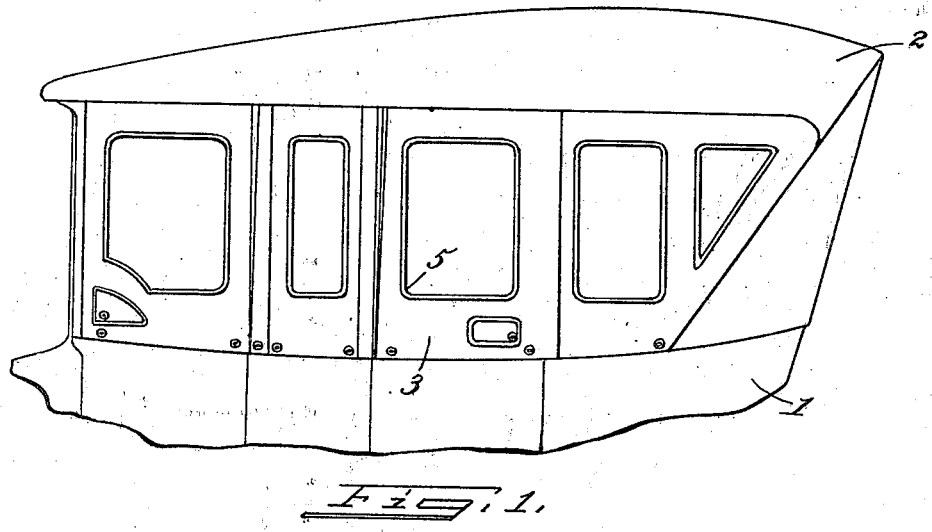
Figure 1 is a side elevation of a car body and top equipped with my new curtain devices.

As shown, the curtains according to my invention are to be demountably secured between the body 1, and top 2 of a motor vehicle. I have shown only a door curtain in the detailed views but it will be understood that the general construction of the various curtains will be the same except for the means of attachment. The side curtains which are not mounted on doors so as to swing open and closed therewith, are equipped with snap fasteners as their principal means of support on the body and top of the vehicle.

The curtains are made up of pieces 3, 3, of fabric, leather substitute, or leather, which are suitably stitched together, and have mounted between them the desired number of plies of veneer board 4 or the like, to provide a stiff portion inside of the edges thereof, but not reaching to the edges.

The curtain material is formed up, to have an opening in the body thereof for the mounting of the glass, and naturally the veneer or other stiffener is likewise formed to provide this opening.

I prefer that the corners 5 of the curtain openings should be rounded, to enhance the appearance of the completed structure, although this is not necessary.

The flexible portions of the curtains around the edges are provided with snap fasteners 6, wherever necessary and in the usual manner, for vehicle side curtains. In case of door curtains, I provide for loose metal clips or plates 7 which are secured through the curtains where re-enforced, and provide loops under which the door irons 8, of the usual pattern will pass. Due to the fact that the loops engage the rods loosely, the curtain is free to ride up and down on the rods, and shift laterally to some extent, thereby taking care of the downward cant which is found in many vehicle door hinges.

In mounting the glass in the curtain openings, the space around the edges of the openings is covered with an adherent putty composition, which is also spread over the margin of the opening, on the inside of the curtain. (Figures 3 and 4.)

Figures 2, 3, 4, 5:
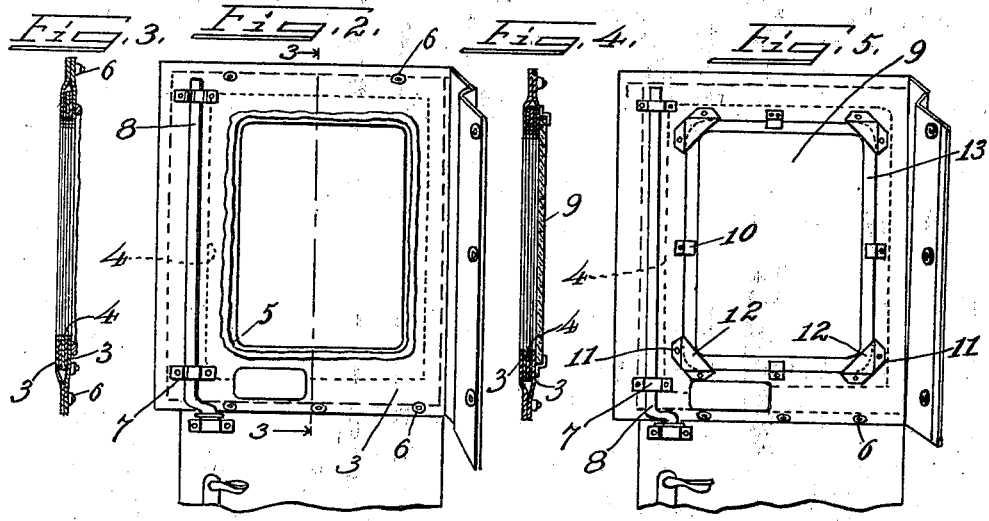
Figure 2 is a side elevation showing a door curtain, in the process of being glazed.
Figure 3 is a section taken on the line 3—3 of Figure 2.
Figure 4 is a detail vertical section showing the glass on my door curtains.
Figure 5 is a side elevation of a completed door curtain made according to my invention.

As is shown in Figure 4, the next step in the glazing of the curtains is to place the glass 9 against the face that has been puttied, and work the putty around the opening into a complete sealing position with regard to the glass, said glass being of a size to lap the curtain opening all of the way around.

A series of clips are employed (Fig. 5) to hold the glass down in place. There are side clips 10, which have bases to be secured by rivets or the like to the stiffened body of the curtain, and raised ends to lie over and engage the glass. There are also corner clips 11, which have a triangular raised portion 12, to engage over the corners of the glass, and embrace said corners on both sides, the remainder of the clip serving as a base for riveting to the curtain.

A curtain constructed as above described, or substantially in accordance with the said structure, will provide a permanent glass in a side curtain, with flexible edges remaining on the curtain for attachment to the top or body of a vehicle.

My usual practice is to paint the lapping edges 13 of the glass with an opaque color, such as black, to hide the puttied face against which the glass rests, and give the job a neat appearance.

The construction is inexpensive, and permanent, satisfying the needs for a body curtain, which, so far as I am aware has never been heretofore provided. There have been instances of course, in which glass has been held in place in a curtain by means of metal bands clamped around the glass on both sides, for the reason, among other things, that no stiff backing was provided for the glass, which would be forced to bend out of shape and crack.

I do not place the duty upon the glass, in my construction, of stiffening the curtain, but stiffen it independently of the glass, providing merely a marginal flexibility.

I do not desire my failure above to mention equivalent structures to exclude from the claim the application of the doctrine of equivalents in their construction.

Having thus described my invention, what I claim as new and desire to secure by Letters Patent, is:—

A curtain for the purpose described comprising a body of two-ply flexible material having a flexible stiffened portion inside of the edges thereof, an aperture formed in the curtain within said flexible stiffened portion, and a glass mounted against the face of the curtain around said aperture with an adherent putty composition surrounding the aperture against which the glass is laid, said glass being adapted to lap the edges of the aperture, and means for retaining the glass in place comprising clips mounted on the flexible stiffened portion of the curtain and engaging over the glass.

LOUIS J. BUOB.